US009182277B2

(12) United States Patent
Hung et al.

(10) Patent No.: US 9,182,277 B2
(45) Date of Patent: Nov. 10, 2015

(54) LIGHT SENSING APPARATUS AND ADJUSTMENT METHOD THEREOF

(71) Applicant: AU OPTRONICS CORP., Hsin-Chu (TW)

(72) Inventors: Chun-Lung Hung, Hsin-Chu (TW); Chang-Hung Yang, Hsin-Chu (TW); Chun-Wei Yang, Hsin-Chu (TW); Chien-Ming Ko, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 248 days.

(21) Appl. No.: 13/714,652

(22) Filed: Dec. 14, 2012

(65) Prior Publication Data

US 2013/0153753 A1 Jun. 20, 2013

(30) Foreign Application Priority Data

Dec. 16, 2011 (TW) .............................. 100146932 A

(51) Int. Cl.
| | |
|---|---|
| *G01J 1/46* | (2006.01) |
| *G01J 1/18* | (2006.01) |
| *G01J 1/42* | (2006.01) |
| *G06F 3/041* | (2006.01) |
| *G06F 3/042* | (2006.01) |

(52) U.S. Cl.
CPC .... *G01J 1/46* (2013.01); *G01J 1/18* (2013.01); *G01J 1/4228* (2013.01); *G06F 3/0412* (2013.01); *G06F 3/0416* (2013.01); *G06F 3/0421* (2013.01)

(58) Field of Classification Search
CPC ... G06F 3/0412; G06F 3/0416; G06F 3/0421; G01J 1/46; G01J 1/18; G01J 1/4228
USPC .......................... 250/205, 208.2, 206, 214 A
See application file for complete search history.

(56) References Cited

U.S. PATENT DOCUMENTS

| | | |
|---|---|---|
| 6,522,395 B1 | 2/2003 | Bamji et al. |
| 8,154,532 B2 | 4/2012 | Chou et al. |
| 2011/0018834 A1 | 1/2011 | Yuan et al. |
| 2011/0290987 A1* | 12/2011 | Liu et al. ................. 250/214 AL |

FOREIGN PATENT DOCUMENTS

| | | |
|---|---|---|
| CN | 102207647 A | 10/2011 |
| TW | 201122977 A | 7/2011 |
| TW | 201142253 A | 12/2011 |

OTHER PUBLICATIONS

Taiwan Patent Office, "Office Action", May 5, 2014.
China Patent Office, "Office Action", May 6, 2014.

* cited by examiner

*Primary Examiner* — Tony Ko
(74) *Attorney, Agent, or Firm* — WPAT, PC; Justin King

(57) ABSTRACT

A light sensing apparatus includes a light sensing module, a signal conversion module and a processing module. The light sensing module is configured to output a first and second sense signals according to a light intensity emitting thereon. The signal conversion module is electrically coupled to the light sensing module and configured to receive the first and second sense signals and output a sense value according to a relative difference between the first and second sense signals, The comparison module is electrically coupled to the signal conversion module and configured to adjust a light sensing characteristic of the light sensing module according to the sense value so as to adjust a light sensing characteristic of the light sensing module. An adjustment method for a light sensing apparatus is also provided.

16 Claims, 14 Drawing Sheets

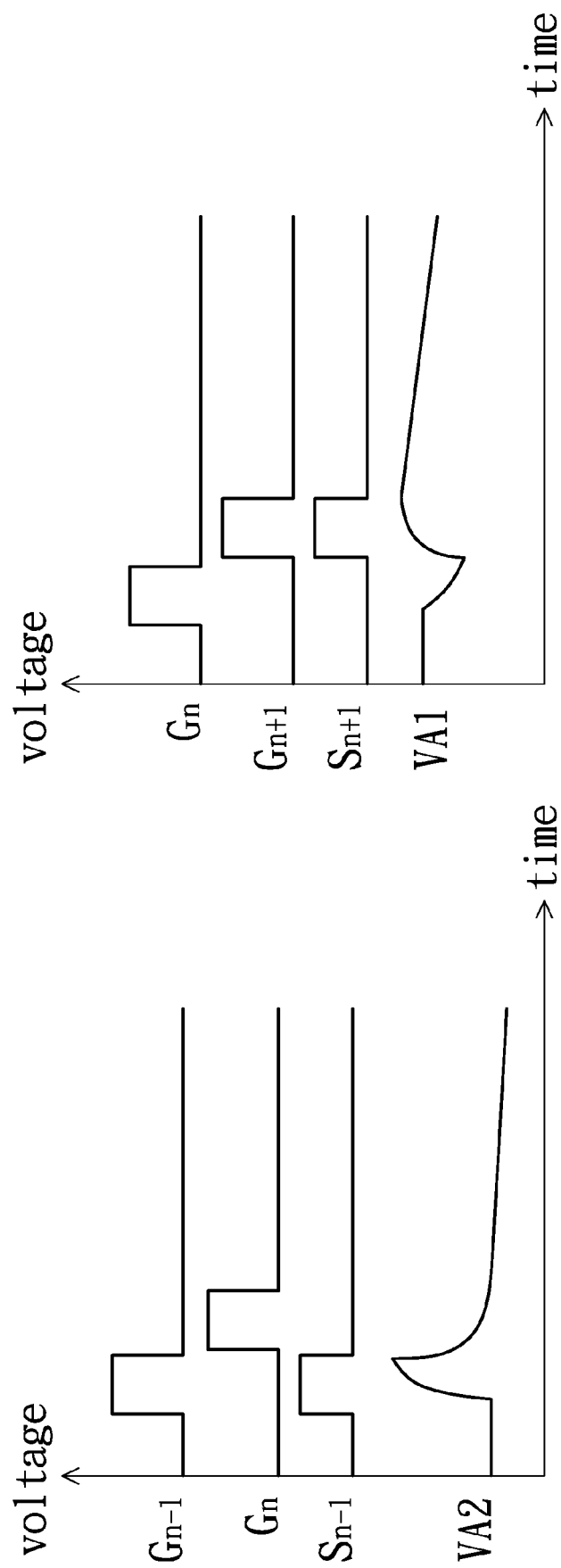

LIGHT SENSING APPARATUS AND ADJUSTMENT METHOD THEREOF

TECHNICAL FIELD

The present disclosure relates to a sensing apparatus and an adjustment method thereof, and more particularly to a light sensing apparatus and an adjustment method thereof.

BACKGROUND

The present touch technologies basically are categorized to several types: impedance, capacitance, light sensing, electromagnetic, supersonic and liquid crystal display (LCD) in-cell; wherein the LCD in-cell can be further categorized to: impedance, capacitance and light sensing. In a display adopting a light sensing in-cell touch panel, the determination of a light sensing apparatus whether or not is being switched-on, so as to further determine whether or not the LCD in-cell is being touched, is based on the leakage current variation caused by different light intensities emitted thereon.

For example, a light sensing apparatus primarily is implemented with thin-film transistors, and the thin-film transistors each may have various leakage currents in response to various light intensities emitted thereon. For example, the leakage current may have a first current value, a second current value and a third current value when the light sensing unit is being touched by an object (for example, a finger), emitted by an environmental light and emitted by a light from a light pen, respectively. Because the leakage current is proportional to the light intensity, accordingly the first current value is smaller than the second current value and the second current value is smaller than the third current value. In addition, a light sensing apparatus further includes an integrator, which is configured to convert the charges derived from the leakage current into an output voltage. Thus, the light sensing in-cell touch panel can determine that whether or not the associated thin-film transistor is being touched according to the output voltage. However, once the light sensing apparatus has been used for a relatively long time, the voltage difference between a gate and source terminals of the light sensing apparatus may have an offset and thereby changing the light sensing apparatus's light sensing characteristics; and thus, consequently a sensing result error is resulted in.

SUMMARY

Therefore, the present disclosure discloses a light sensing apparatus and an adjustment method thereof. Through providing a feedback path, a light sensing characteristic of the light sensing module is adjusted/calibrated so as to avoid the sensing result error.

An embodiment of the present disclosure provides a light sensing apparatus, which includes a light sensing module, a signal conversion module and a processing module. The light sensing module is configured to output a first sense signal and a second sense signal according to an emitting light intensity thereon. The signal conversion module is electrically coupled to the light sensing module and configured to receive the first and second sense signals from the light sensing module and output a sense value according to a relative difference between the first and second sense signals. The processing module is electrically coupled to the signal conversion module and configured to adjust a light sensing characteristic of the light sensing module according to the sense value so as to adjust a light sensing characteristic of the light sensing module.

Another embodiment of the present disclosure provides an adjustment method for a light sensing apparatus, comprising: outputting a first sense signal and a second sense signal according to a light intensity emitting on a light sensing module of the light sensing apparatus; outputting a sense value according to a relative difference between the first sense signal and the second sense signal; and comparing the sense value at different time with a default value to obtain an accumulated number, which indicates times of the sense value being greater than or equal to the default value at different time, so as to determine whether or not to provide an adjustable driving voltage for an adjustment of a light sensing characteristic of the light sensing apparatus.

Still another embodiment of the present disclosure provides a light sensing apparatus, which includes a light sensing module, a signal conversion module and a processing module. The light sensing module is configured to output a plurality of sense signals according to a light intensity emitting thereon. The signal conversion module is electrically coupled to the light sensing module and configured to receive the sense signals from the light sensing module and output a sense value according to the sense signals. The processing module is electrically coupled to the signal conversion module and configured to determined whether or not to adjust a light sensing characteristic of the light sensing module according to a comparison result obtained from comparing an accumulated number to a threshold value, wherein the accumulated number indicates that a number of the sense values received within a specific time period located between a first default value and a second default value.

Yet another embodiment of the present disclosure provides an adjustment method for a light sensing apparatus, which includes steps of: outputting a first sense signal according to a light intensity emitting on the light sensing apparatus; outputting a sense value according to the first sense signal; and determining whether or not to adjust a light sensing characteristic of the light sensing apparatus according to a comparison result obtained from comparing an accumulated number to a threshold value, wherein the accumulated number indicates that the number of the sense values received within a specific time period located between a first default value and a second default value.

In summary, in the light sensing apparatus and the adjustment method thereof according to the present disclosure, the control module is configured to determine, according to a first sense signal and a second sense signal from the light sensing module, that whether or not the light sensing module has a light sensing characteristic variation, and output an adjustable driving voltage, if having the light sensing characteristic variation, to the light sensing module so as to adjust the light sensing characteristic of the light sensing module. Accordingly, the sensing result errors occurring in a convention light sensing module is prevented.

BRIEF DESCRIPTION OF THE DRAWINGS

The present disclosure will become more readily apparent to those ordinarily skilled in the art after reviewing the following detailed description and accompanying drawings, in which:

FIG. 3A is a schematic timing sequence view of the signals associated with the second light sensing unit in FIG. 2;

FIG. 3B is a schematic timing sequence view of the signals associated with the first light sensing unit in FIG. 2;

DETAILED DESCRIPTION OF EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
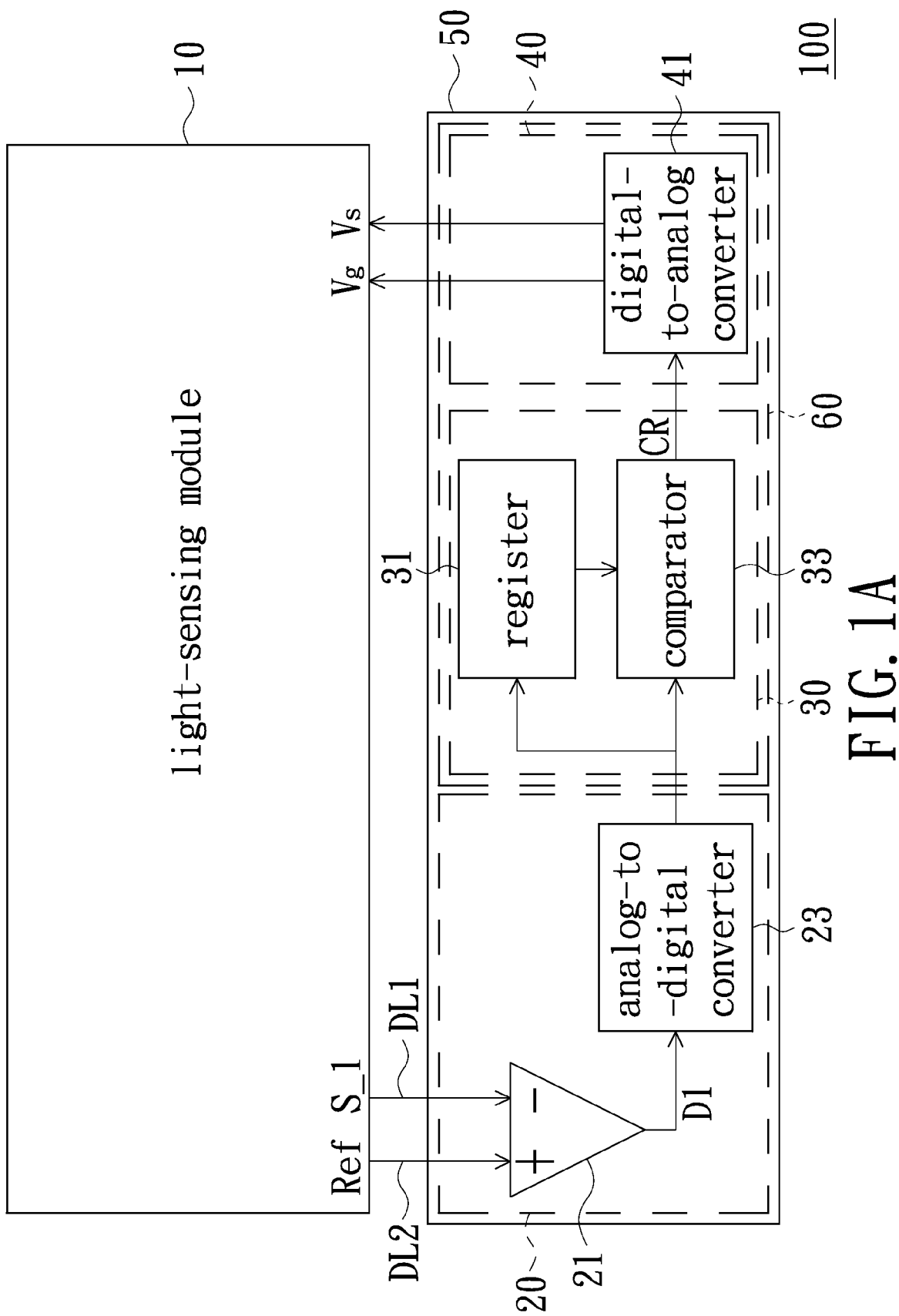
FIG. 1A is a schematic block view of a light sensing apparatus in accordance with an embodiment of the present disclosure.

FIG. 1A is a schematic block view of a light sensing apparatus in accordance with an embodiment of the present disclosure. As shown, the light sensing apparatus 100 in this embodiment includes a light sensing module 10 and a control module 50; wherein the light sensing module 10 is electrically coupled to the control module 50.

The light sensing module 10 is configured to output a first sense signal S_1 and a second sense signal Ref according to a light intensity emitted thereon, which are for a reference of a determination of a light sensing touch operation status. For example, the light sensing module 10 is configured to output a high-level first sense signal S_1 and the second sense signal Ref in response to a touched status, which indicates that the light sensing module 10 is being emitted by a light from a light pen (not shown); alternatively, the light sensing module 10 is configured to output a low-level first sense signal S_1 and the second sense signal Ref (or, configured to not output the first sense signal S_1 and the second sense signal Ref) in response to a non-touched status, which indicates that the light sensing module 10 is not being emitted by a light from a light pen. In addition, the light sensing module 10 may further include, with no limitation, a plurality of thin-film transistors, capacitors and other types of electronic component. The light sensing module 10 is, for example, a light sensing touch display or other types of display with similar displaying characteristics.

Figure 2:
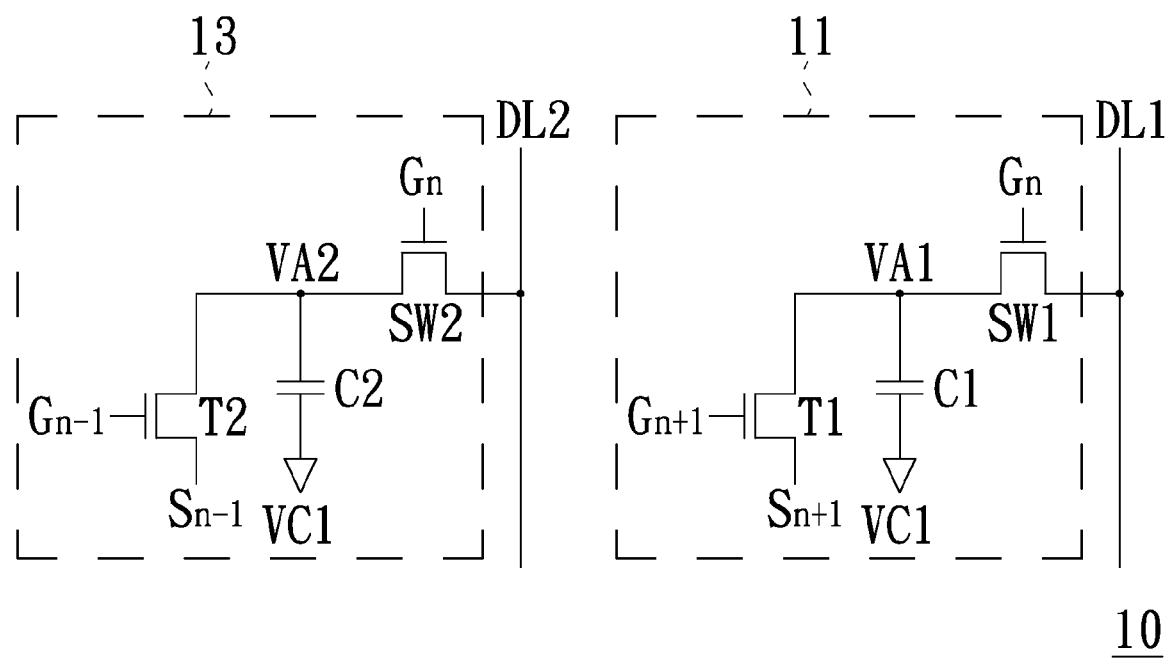
FIG. 2 is a schematic circuit view of a light sensing module in accordance with an embodiment of the present disclosure.

Please refer to FIG. 1A and FIG. 2, which is a schematic circuit view of the light sensing module 10 in accordance with an embodiment of the present disclosure. As shown, the control module 50 includes a signal conversion module 20, a processing module 60 including a comparison module 30 and an adjustment module 40. The control module 50 is electrically coupled to a first readout line DL1 and a second readout line DL2 and from which to receive the first sense signal S_1 and the second sense signal Ref, respectively. The control module 50 is configured to output an adjustable driving voltage to the light sensing module 10 so as to adjust at least one of a second control signal Gn+1, a third control signal Sn+1, a fourth control signal Gn−1 and a fifth control signal Sn−1 associated with the light sensing module 10.

As shown in FIG. 1A, the signal conversion module 20 is electrically coupled to the light sensing module 10 and configured to receive the first sense signal S_1 and the second sense signal Ref from the light sensing module 10 and convert a relative difference of the first sense signal S_1 and the second sense signal Ref so as to output a sense value. In other word, the signal conversion module 20 is configured to output the sense value according to the relative difference between the first sense signal S_1 and the second sense signal Ref. In particular, the signal conversion module 20 is, for example, implemented with a differential amplifier 21 and an analog-to-digital converter (ADC) 23.

The differential amplifier 21 is configured to have its first input terminal (for example, a negative input terminal) for receiving the first sense signal S_1, its second input terminal (for example, a positive input terminal) for receiving the second sense signal Ref and its output terminal (not designated by a number) for outputting a differential signal D1 according to a relative difference between the first sense signal S_1 and the second sense signal Ref. Specifically, the differential signal D1 is, for example, obtained by firstly subtracting the second sense signal Ref by the first sense signal S_1 and then multiplying the difference by a ratio.

The analog-to-digital converter 23 is electrically coupled to the output terminal of the differential amplifier 21 and configured to receive the differential signal D1 and convert the differential signal D1 into the sense value.

Figure 1B:
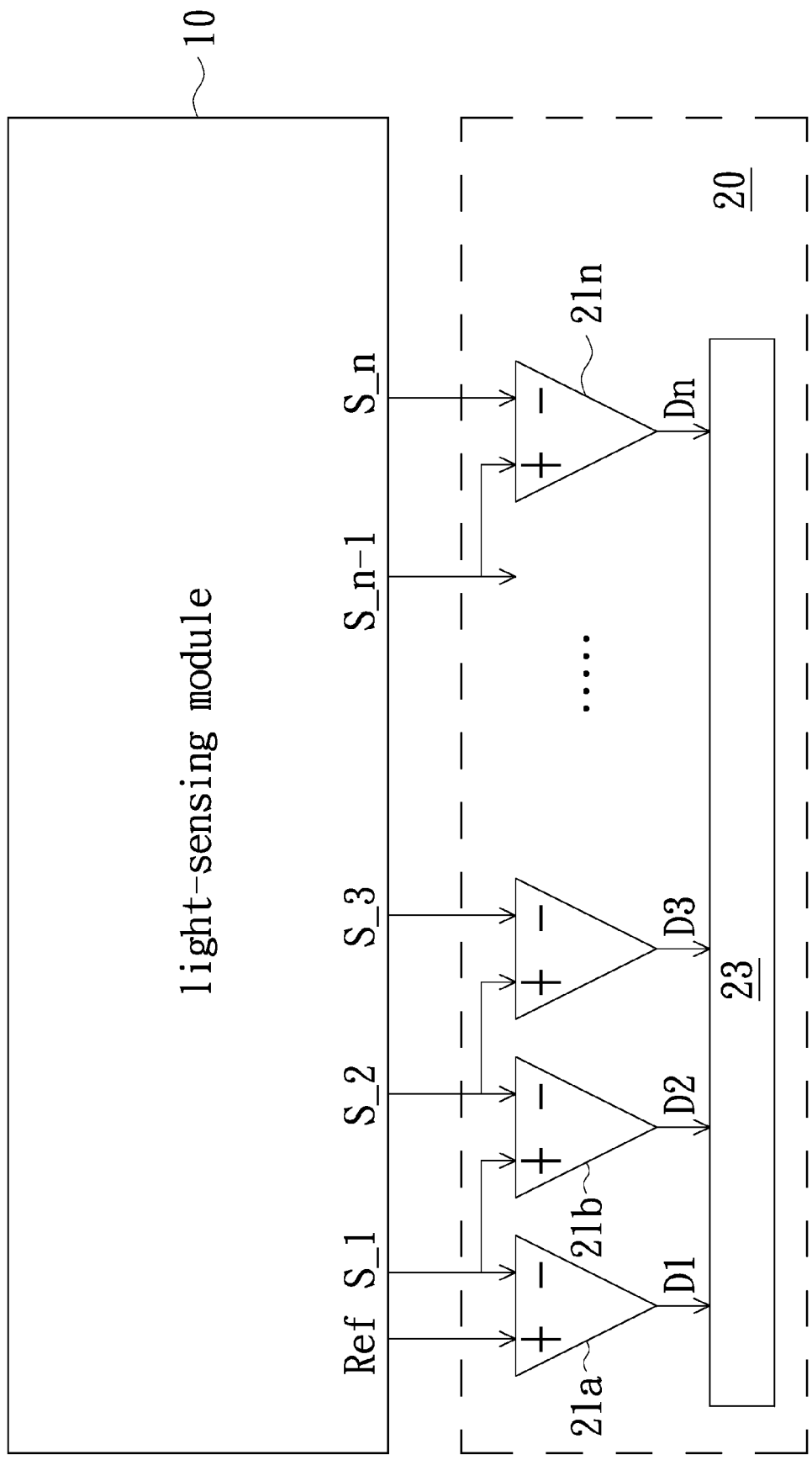
FIG. 1B is a schematic block view of a signal conversion module arranged in the light sensing apparatus shown in FIG. 1A.

In another circuit configuration, the signal conversion module 20 may include more than one differential amplifiers as shown in FIG. 1B; wherein it is to be noted that the processing module 60 herein is omitted for brevity. Specifically, the differential amplifier 21a is configured to receive the sense signal S_1 and the sense signal Ref and accordingly output the differential signal D1 to the analog-to-digital converter 23; the differential amplifier 21b is configured to receive the sense signal S_1 and the sense signal S_2 and accordingly output the differential signal D2 to the analog-to-digital converter 23; . . . ; and the differential amplifier 21n is configured to receive the sense signal S_n−1 and the sense signal S_n and accordingly output the differential signal Dn to the analog-to-digital converter 23.

Referring to FIG. 1A again. The comparison module 30 is electrically coupled to the signal conversion module 20 and configured to store with a default value, which can be inputted or updated by a user through an information processing apparatus (for example, a human-machine interface (not shown)). The comparison module 30 is further configured to compare the sense value, which is transmitted from the signal conversion module 20, with the default value and accordingly determine whether or not to output a comparison result CR. For example, the comparison module 30 is configured to output the comparison result CR to the adjustment module 40 so as to enable the adjustment module 40 if the sense value is greater than the default value.

In another embodiment, the comparison module 30 may be configured to determine whether or not to output the comparison result CR according to another determination condition, which is, for example, an accumulated number is greater than or equal to a threshold value; wherein the accumulated number is the number of the sense values generated within a specific time period having a value greater than or equal to the default value. In other words, the comparison module 30 is configured to output the comparison result CR to the adjustment module 40 if the accumulated number is greater than or equal to the threshold value. It is understood that a counter (not shown) accordingly is arranged in the comparison module 30 for the counting of the accumulated number. Specifically, the counter may be, for example and with no limitation, arranged in the register 31, from which to obtain the sense value and the default value. In addition, the time period for the counting of the accumulated number is a frame time, which is the time length required by all the light sensing units (not shown) in the light sensing module 10 for sequentially executing a sensing function. Moreover, the accumulated number may be configured to zero when the light sensing module 10 is being touched (for example, emitted by a light from a light pen).

Specifically, the comparison module 30 is implemented with the register 31 and a comparator 33. The register 31 is electrically coupled to the output terminal of the analog-to-digital converter 23 and configured to store with and provide the default value to the comparator 33. The comparator 33 is electrically coupled to an output terminal of the register 31 and an output terminal of the analog-to-digital converter 23 and configured to compare the sense value with the default value and accordingly output the comparison result CR to a digital-to-analog converter (DAC) 41. Moreover, the register 31 may be further configured to store the threshold value and the comparator 33 may be further configured to compare the accumulated number with the threshold value.

The adjustment module 40 is electrically coupled between the comparison module 30 and the light sensing module 10 and configured to receive the comparison result CR from the comparison module 30 and accordingly output an adjustable driving voltage to the light sensing module 10 so as to adjust a light sensing characteristic of the light sensing module 10.

The adjustment module 40 includes the digital-to-analog converter 41, which is electrically coupled to an output terminal of the comparator 33 and two output terminals thereof are electrically coupled to the light sensing module 10. Specifically, the digital-to-analog converter 41 is configured to output an adjustable driving voltage Vg to the gate terminals of the light sensing transistors in the light sensing module 10 (for example, the terminal of the first light sensing transistor T1 for receiving the second control signal Gn+1) and/or an adjustable driving voltage Vs to the source terminals of the light sensing transistors in the light sensing module 10 (for example, the terminal of the first light sensing transistor T1 for receiving the third control signal Sn+1). Therefore, the voltage difference between the gate and source terminals of each of the light sensing transistors can be adjusted by the adjustable driving voltage and consequently the light sensing characteristic of the light sensing module 10 is modulated.

Figure 1C:
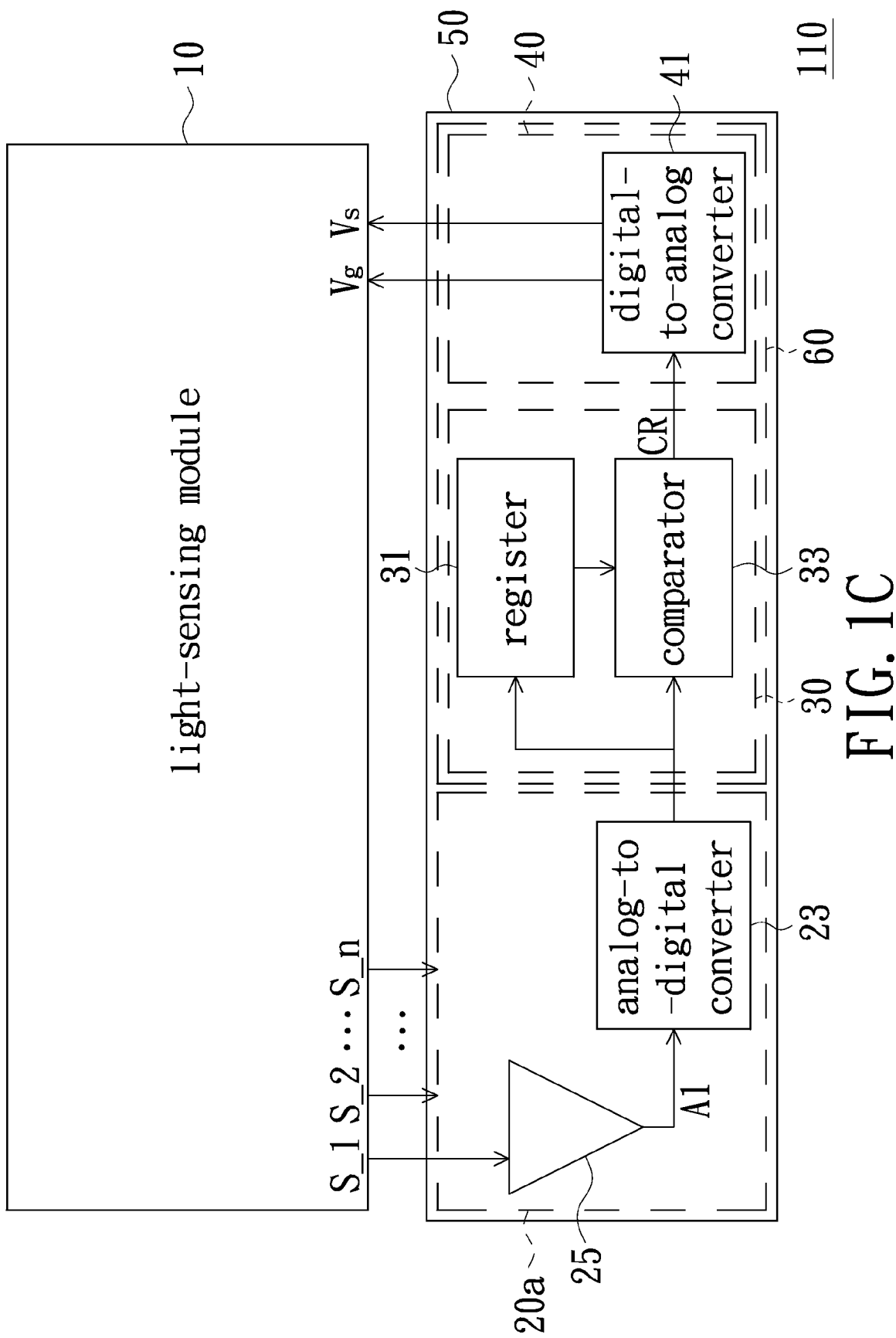
FIG. 1C is a schematic block view of a light sensing apparatus in accordance with another embodiment of the present disclosure.

FIG. 1C is a schematic block view of a light sensing apparatus in accordance with another embodiment of the present disclosure. As shown, the light sensing apparatus 110 in this embodiment has a circuit structure similar to that of the aforementioned light sensing apparatus 100. The main difference between the two embodiments is the signal conversion module. Specifically, the signal conversion module 20a of the light sensing apparatus 110 adopts a plurality of operation amplifiers instead of the differential amplifiers (herein, it is to be noted that only one operation amplifier 25 is exemplified in the light sensing apparatus 110 shown in FIG. 1C); and the light sensing module 10 includes a plurality of light sense units (not shown) with a light sensing function and configured to output the sense signals S_1~S_n according to the light intensities thereon. For example, the operation amplifier 25 is configured to receive the sense signal S_1 and accordingly output an integrated signal A1. The analog-to-digital converter 23 is electrically coupled to the output terminal of the operation amplifier 25 and configured to receive the integrated signal A1 and convert the integrated signal A1 into the sense value. The comparison module 30 is electrically coupled to the signal conversion module 20a and configured to store with a default value set 31a (as illustrated in FIG. 1E). The comparison module 30 is further configured to compare the sense value with the sense value set 31a and thereby determining whether or not to output a comparison result CR according to specific determination conditions.

Figure 1D:
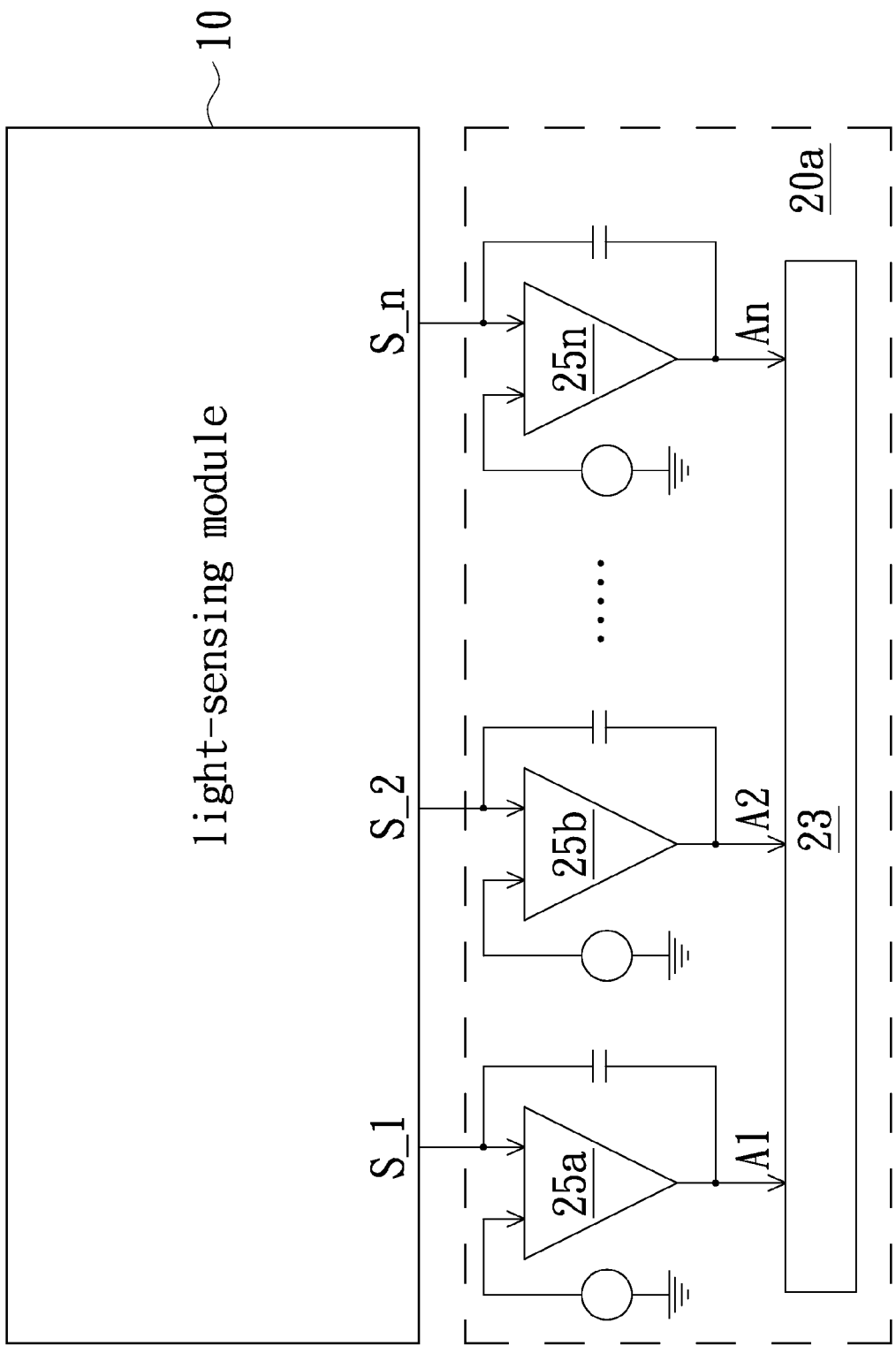
FIG. 1D is a schematic block view of a signal conversion module arranged in the light sensing apparatus shown in FIG. 1C.
Figure 1E:
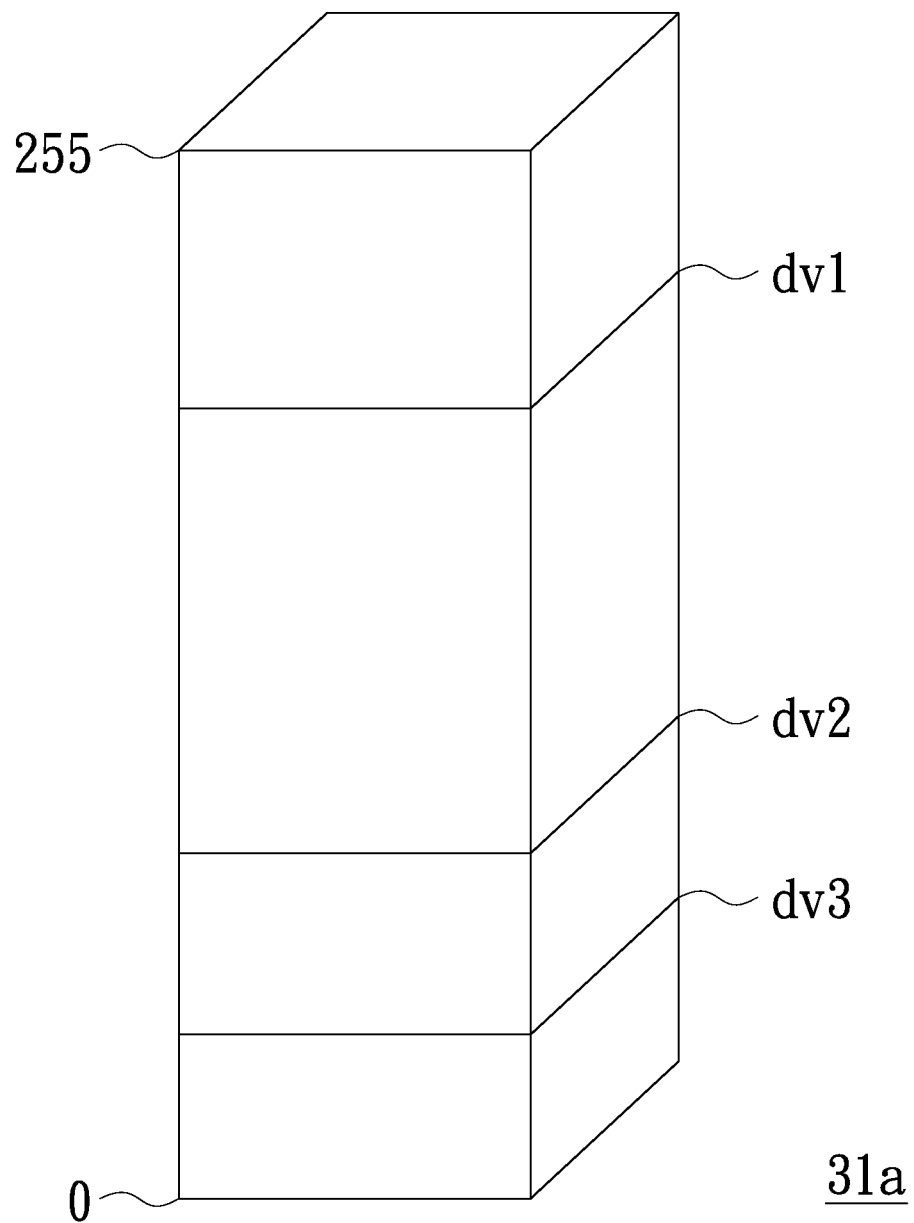
FIG. 1E is a schematic view illustrating an exemplified constitution of the default value set.

FIG. 1D is a schematic block view of the signal conversion module 20a; wherein it is to be noted that the control module 50 herein is omitted for brevity. Specifically, the operation amplifier 25a is configured to receive the sense signal S_1 and accordingly output the integrated signal A1 to the analog-to-digital converter 23; the operation amplifier 25b is configured to receive the sense signal S_2 and accordingly output the integrated signal A2 to the analog-to-digital converter 23; . . . ; and the operation amplifier 25n is configured to receive the sense signal S_n and accordingly output the integrated signal An to the analog-to-digital converter 23.

It is understood that the light intensity can be defined by 0~255 gray levels; therefore, as illustrated in FIG. 1E, the default value set 31a is exemplarily constituted by default values dv1, dv2 and dv3; wherein, the default values dv1, dv2 and dv3 indicate the 200, 80 and 30 gray-levels, respectively; and the present disclosure is not limited thereto. Specifically, the comparison module 33 outputs the comparison result CR to the digital-to-analog converter 41 when the sense value is located between two adjacent default values, for example, the default value dv2 and the default value dv3.

The light sensing module 10 includes a plurality of light sensing units and herein is exemplified by two light sensing units, as shown in FIG. 2. The first light sensing unit 11 is electrically coupled to the first readout line DL1 and the adjustment module 40; wherein the readout line DL1 is electrically coupled to the signal conversion module 20. The first light sensing unit 11 includes a first light sensing transistor T1, a first capacitor C1 and a first transistor SW1. The first capacitor C1 is configured to have its first terminal electrically coupled to a first terminal (for example, a source terminal) of the first transistor SW1 and its second terminal for receiving a common voltage VC1. The first transistor SW1 is configured to have its second terminal (for example, a drain terminal) electrically coupled to the first readout line DL1 and its gate terminal for receiving the first control signal Gn.

The first light sensing transistor T1 is configured to have its first terminal (for example, a drain terminal) electrically coupled to the first terminal of the first capacitor C1, its gate terminal for receiving the second control signal Gn+1 and its second terminal (for example, a source terminal) for receiving the third control signal Sn+1. In particular, the first transistor SW1 is, while being switched-on, configured to output the first sense signal S_1 to the first readout line DL1 through the second terminal thereof. In addition, the first light sensing transistor T1 is configured to have its gate terminal and/or its second terminal (for example, a source terminal) for receiving the adjustable driving voltage from the adjustment module 40 so as to adjust a light sensing characteristic thereof. For example, the first light sensing transistor T1 can have a lower voltage difference between the gate and source terminals thereof through adjusting the adjustable driving voltage supplied to the gate and/or source terminals of the first light sensing transistor T1. In other words, through adjusting the second control signal Gn+1 and/or the third control signal Sn+1, the voltage difference between the gate and source terminals of the first light sensing transistor T1 is modulated.

The second light sensing unit 13 is electrically coupled to the second readout line DL2, which is electrically coupled to the signal conversion module 20, and disposed to be adjacent to the first light sensing unit 11; therefore, the first light sensing unit 11 and the second light sensing unit 13 each receive a similar light intensity. The second light sensing unit 13 includes a second light sensing transistor T2, a second capacitor C2 and a second transistor SW2. The second capacitor C2 is configured to have its first terminal electrically coupled to a first terminal (for example, a source terminal) of the second transistor SW2 and its second terminal for receiving the common voltage VC1. The second transistor SW2 is configured to have its second terminal (for example, a drain terminal) electrically coupled to the second readout line DL2 and its gate terminal for receiving the first control signal Gn. The second light sensing transistor T2 is configured to its gate terminal and its second terminal (for example, a source terminal) for receiving the adjustable driving voltages from the adjustment module 40 so as to adjust a light sensing characteristic thereof. For example, the second light sensing transistor T2 can have a smaller voltage difference between the gate and source terminals thereof through adjusting the adjustable driving voltage supplied to the gate and/or source terminals of the second light sensing transistor T2. In other words, through adjusting the fourth control signal Gn−1 and/or the fifth control signal Sn−1, the voltage difference between the gate and source terminals of the first light sensing transistor T1 is modulated.

The second light sensing transistor T2 is configured to have its first terminal (for example, a drain terminal) electrically coupled to the first terminal of the second capacitor C2, its gate terminal for receiving the fourth control signal Gn−1 and its second terminal (for example, a source terminal) for receiving the fifth control signal Sn−1. In particular, the second transistor SW2 is, when being switched-on, configured to output the second sense signal Ref to the second readout line DL2 through the second terminal thereof. Besides, the second light sensing transistor T2 is configured to have its gate terminal and/or its second terminal (for example, a source terminal) for receiving the adjustable driving voltage from the adjustment module 40 so as to adjust a light sensing characteristic thereof. In other words, the gate and source terminals of the second light sensing transistor T2 can have a voltage variation therebetween through adjusting at least one of the adjustable driving voltages supplied to the gate terminal and the source terminal of the second light sensing transistor T2. Moreover, the circuit structures and the number of the components in FIG. 2 are for illustration only and with no limitation.

Please refer to FIGS. 2, 3A and 3B. FIGS. 3A, 3B are schematic timing sequence views of the signals associated with the second light sensing unit 13 and the first light sensing unit 11, respectively. As shown in FIG. 2, the first transistor SW1 and the second transistor SW2 each are configured to have its gate terminal for receiving the first control signal Gn. The first light sensing transistor T1 is configured to have its gate terminal for receiving the second control signal Gn+1 and its second terminal (for example, a source terminal) for receiving the third control signal Sn+1. The second light sensing transistor T2 is configured to have its gate terminal for receiving the fourth control signal Gn−1 and its second terminal (for example, a source terminal) for receiving the fifth control signal Sn−1.

As shown in FIGS. 3A, 3B, the first control signal Gn in FIG. 3A and the first control signal Gn in FIG. 3B each have an identical time sequence. The first control signal Gn has a rising edge leading off that of the second control signal Gn+1 and the third control signal Sn+1. The second control signal Gn+1 and the third control signal Sn+1 each have an identical time sequence. The second control signal Gn+1 has a rising edge lagging behind that of the fourth control signal Gn−1 and the fifth control signal Sn−1. The fourth control signal Gn−1 and the fifth control signal Sn−1 each have an identical time sequence. The second control signal Gn+1 has a rising edge lagging behind that of the first control signal Gn.

In particular, the time length, from the first transistor SW1 resting the voltage of the first capacitor C1 (for example, a terminal voltage VA1) through the third control signal Sn+1 to the next time the first transistor SW1, when being switched-on, outputting the first sense signal S_1, is configured to be greater than the time length, from the second transistor SW2 resting the voltage of the second capacitor C2 (for example, a terminal voltage VA2) through the fifth control signal Sn−1 to the next time the second transistor SW2, when being switched-on, outputting the second sense signal Ref. In other word, in the present embodiment, the first light sensing unit 11 is configured to firstly perform a signal resetting operation and then perform, after a frame time, a signal reading operation; wherein in this frame time the voltage of the first capacitor C1 is, due to the first light sensing transistor T1 can have a specific leaking current varying with the light intensity emitted thereon, configured to be discharged through the first light sensing transistor T1. However, the second light sensing unit 13 is configured to firstly perform a signal resetting operation and then immediately perform a signal reading operation; therefore, the time length for the second light sensing unit 13 to perform a discharging operation through the second light sensing transistor T2 accordingly is, with no limitation, less than a frame time. Moreover, the first sense signal S_1 is derived from the terminal voltage VA1 of the first capacitor C1, and the second sense signal Ref is derived from the terminal voltage VA2 of the second capacitor C2.

To sum up, in one touch sensing operation, firstly the first light sensing unit 11 is configured to perform a signal resetting operation; in a next frame time, the first capacitor C1 is, due to the first light sensing transistor T1 can have a specific leakage current varying with the light intensity emitted thereon, configured to be discharged through the first light sensing transistor T1; then, the second light sensing unit 13 is configured to perform a signal resetting operation through the fourth control signal Gn−1 and the fifth control signal Sn−1; and then, the first light sensing unit 11 and the second light sensing unit 13 are configured to perform a signal reading operation, that is, the first light sensing unit 11 and the second light sensing unit 13 are configured to switch on the second transistor SW2 and the second transistor SW1 so as to readout the terminal voltage VA1 of the first capacitor C1 and the terminal voltage VA2 of the second capacitor C2, respectively.

In particular, if the light sensing module 10 is integrally produced with a display panel (for example, a liquid crystal display panel, not shown), the fourth control signal Gn−1, the first control signal Gn and the second control signal Gn+1 are also referred to as scan signals of pixels of the display panel; wherein the fourth control signal Gn−1 is configured to scan the pixels in the $(n-1)_{th}$ row of the display panel, the first control signal Gn is configured to scan the pixels in the $n_{th}$ row of the display panel, the second control signal Gn+1 is configured to scan the pixels in the $(n+1)_{th}$ row of the display panel, and so on. It is understood that there are N numbers of control signal each is configured to update the pixels in the same associated row if the display panel includes N numbers of rows of pixels; wherein N is a nature number and greater than zero, and the N numbers of control signal are electrically coupled to the light sensing unit of the light sensing module 10 and each configured to sequentially enable the updates of the associated rows of pixels. In addition, the N numbers of control signal each is configured to be electrically connected to an associated light sensing unit in the light sensing module 10. For example, the second light sensing unit 13 is electrically coupled to the fourth control signal Gn−1 and the first control signal Gn; and the first light sensing unit 11 is electrically coupled to the first control signal Gn and the second control signal Gn+1. Alternatively, if the light sensing module 10 is not integrally produced with a display panel, the fourth control signal Gn−1, the first control signal Gn and the second control signal Gn+1 each are a control signal and configured to sequentially enable and control the light sensing module 10; wherein in each control duty, the fourth control signal Gn−1 is configured to have an enable state leading off that of the first control signal Gn, and the first control signal Gn is configured to have an enable state leading off that of the second control signal Gn+1.

For example, in the $M_{th}$ frame time, the first light sensing unit 11 is configured to output the terminal voltage VA1 of the first capacitor C1 according to the enable first control signal Gn. In addition, in the $(M-1)_{th}$ frame, the first capacitor C1 is configured to be performed by a signal resetting operation on the terminal voltage VA1 thereof and to be discharged, due to the first light sensing transistor T1 can have a specific leakage current varying with the light intensity emitted thereon, through the first light sensing transistor T1. Then, in the $M_{th}$ frame, because the first capacitor C1 is configured to be performed by a signal resetting operation on the terminal voltage VA1 thereof through the second control signal Gn+1 and the third control signal Sn+1 and the terminal voltage VA1 is discharged by the first light sensing transistor T1 (due to the first light sensing transistor T1 can have a conductive level varying with the light intensity emitted thereon). In the $(M+1)_{th}$ frame, the first light sensing unit 11 is configured to output the terminal voltage VA1 again by the first control signal Gn.

Similarly, in the $M_{th}$ frame, the terminal voltage VA2 of the second capacitor C2 is rest through the second light sensing unit 13 according to the enable fourth control signal Gn−1 and the enable fifth control signal. Then, in the same frame (that is, the $M_{th}$ frame), the terminal voltage VA2 of the second capacitor C2 is readout according to the enable first control signal Gn. Therefore, in the $M_{th}$ frame, although the terminal voltage VA1 of the first capacitor C1 and the terminal voltage VA2 are respectively readout through the first light sensing unit 11 and the second light sensing unit 13 and simultaneously through the enable first control signal Gn, but the terminal voltage VA2 of the second capacitor C2 is not a duration of discharged one frame. The terminal voltage VA1 is rest through the voltage of the $(M-1)_{th}$ to the reading of the $M_{th}$ frame is the duration of discharged one frame.

Figure 4A:
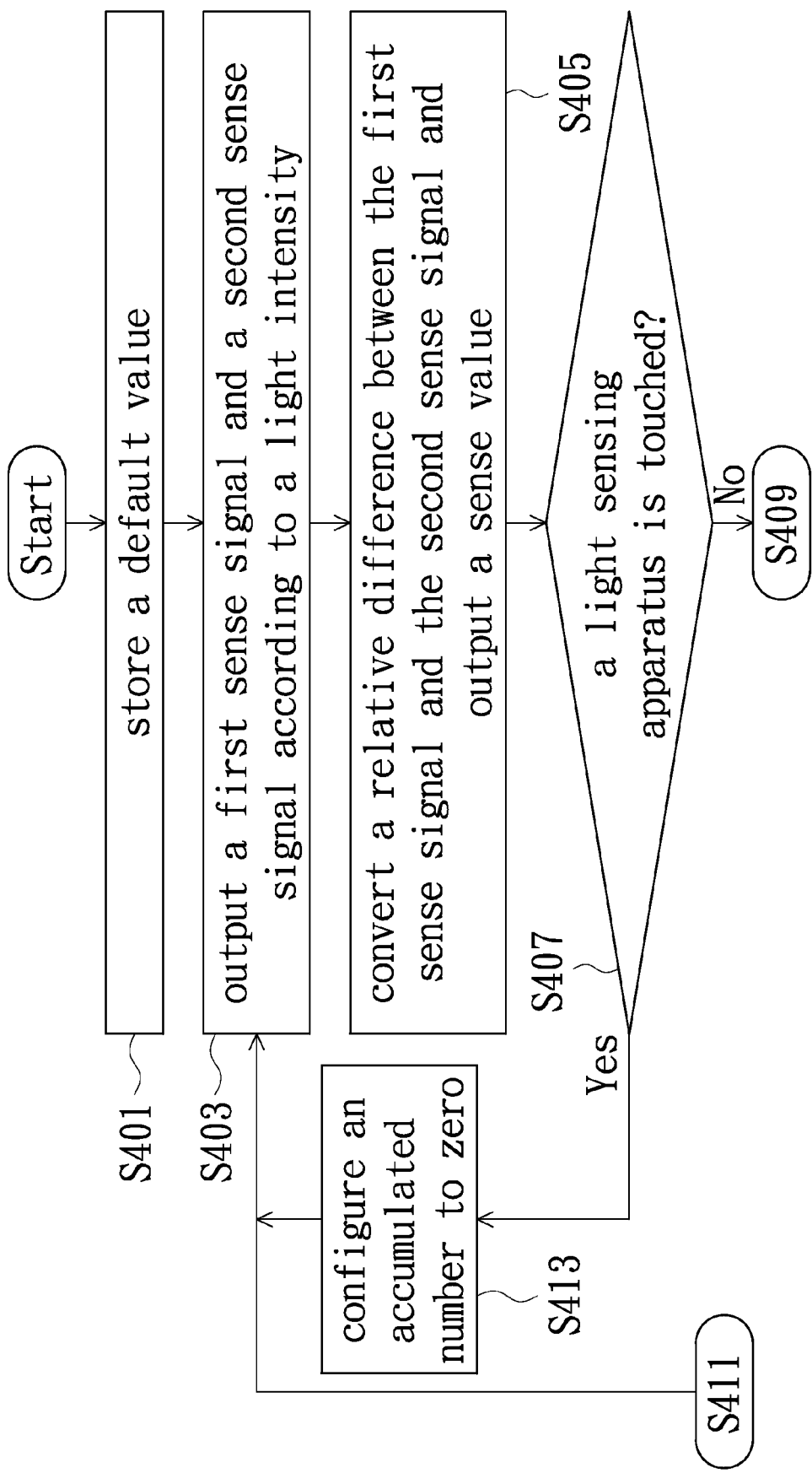
FIGS. 4A, 4B and 4C are schematic flow charts illustrating an adjustment method for a light sensing apparatus in accordance with an embodiment of the present disclosure.
Figure 4B:
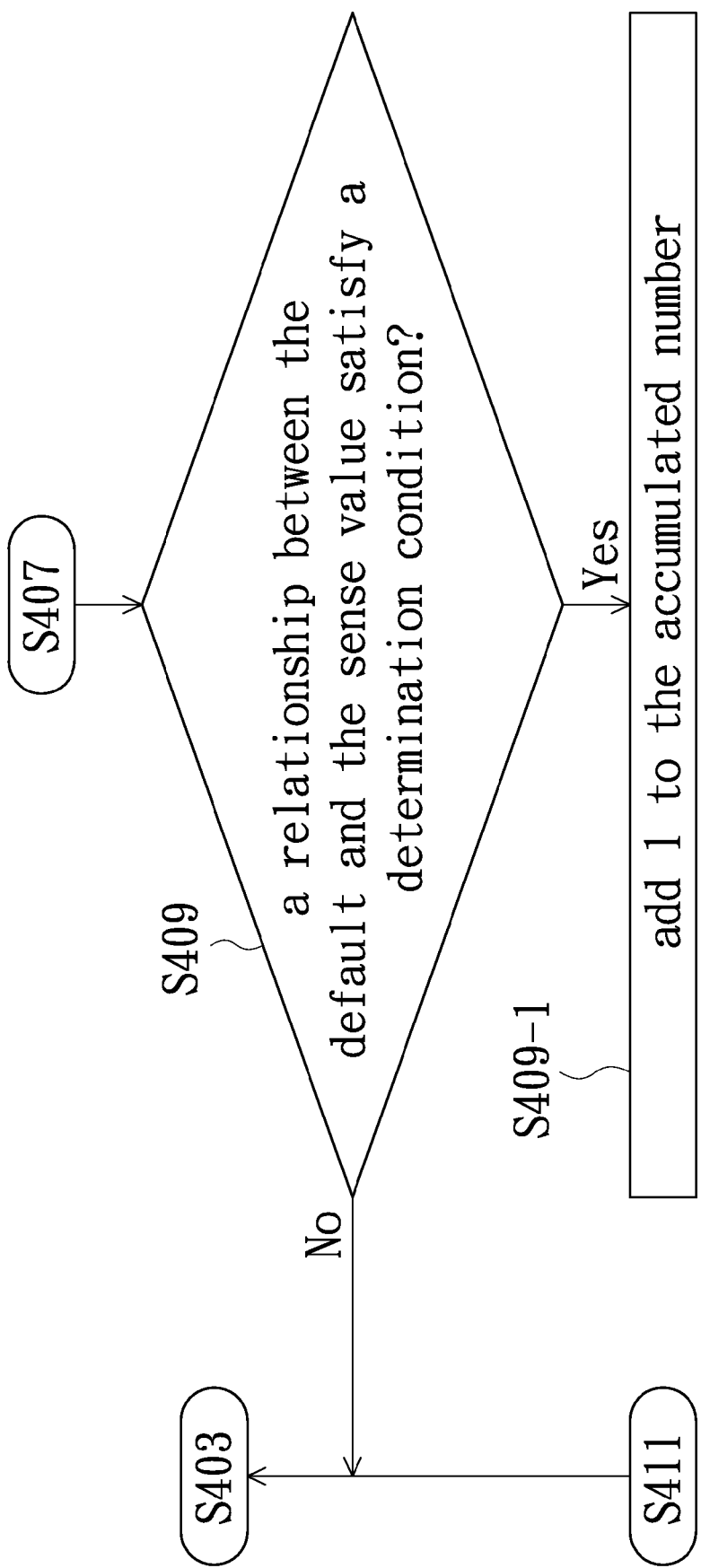
Figure 4C:
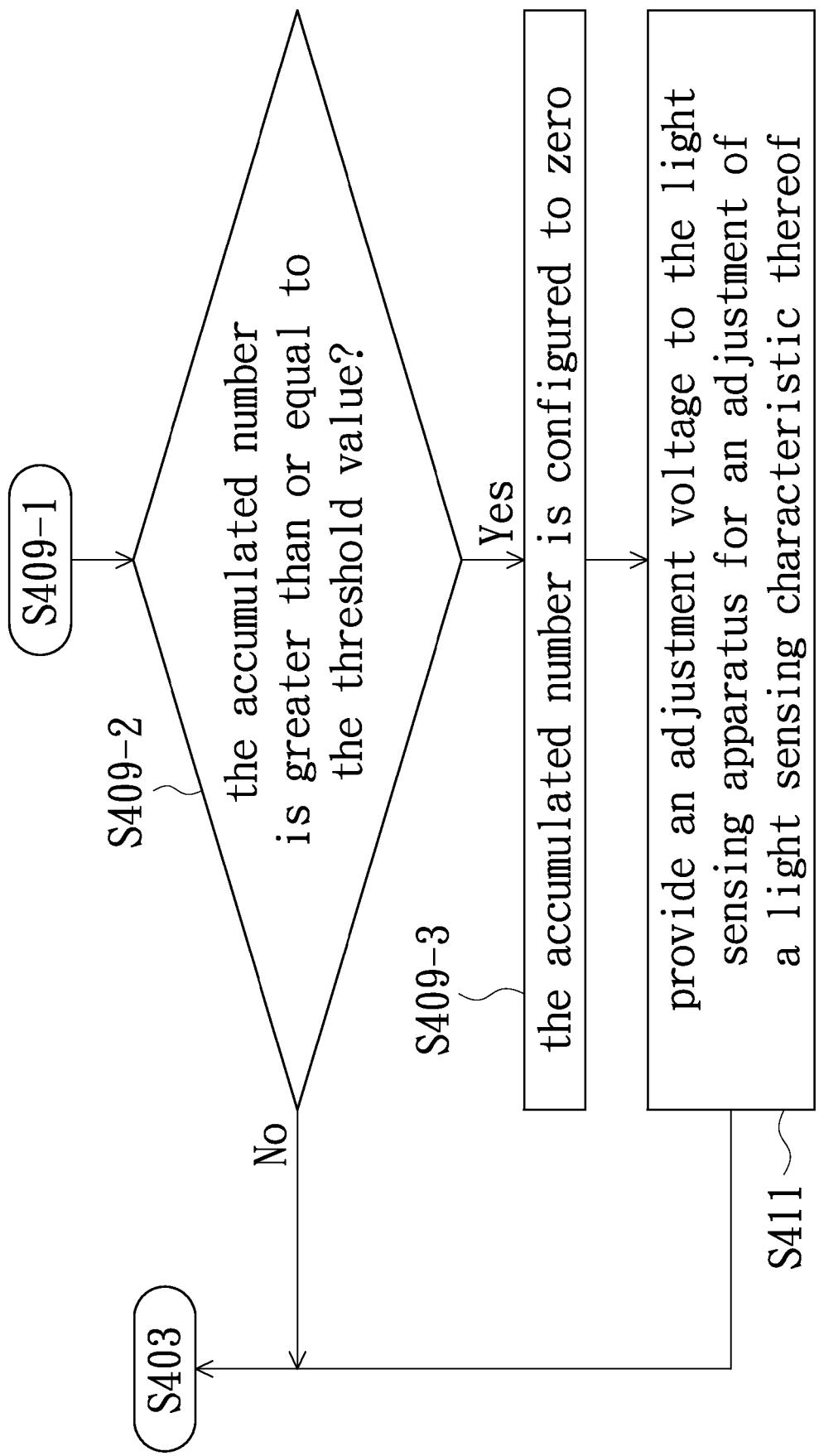

Please refer to FIGS. 1A, 4A, 4B and 4C. FIGS. 4A, 4B and 4C are schematic flow charts of an adjustment method for a light sensing apparatus in accordance with an embodiment of the present disclosure.

Firstly, the register 31 of the comparison module 30 is configured to store with a first default value (step S401); wherein the first default value may be inputted and updated by a user or a manufacturer through an information process apparatus (for example, a human-machine interface (not shown)). Then, the light sensing module 10 is configured to output the first sense signal S_1 and the second sense signal Ref to the signal conversion module 20 of the control module 50 according to a light intensity emitting thereon (step S403).

Next, a sense value is generated according to a relative difference between the first sense signal S_1 and the second sense signal Ref (step S405).

Next, the light sensing module 10 is determined whether or not being touched according to the first sense signal S_1 and the second sense signal Ref (step S407). For example, the relative difference between the first sense signal S_1 and the second sense signal Ref is relatively large when the light sensing module 10 is being emitted by lights from a light pen (not shown); therefore, the light sensing module 10 is determined to be in a touched status if the difference between the second sense signal Ref and the first sense signal S_1 is greater than or equal to a second default value. Alternatively, the relative difference between the first sense signal S_1 and the second sense signal Ref is relatively small when the light sensing module 10 is not being emitted by lights from a light pen; therefore, the light sensing module 10 is determined to be in a non-touched status if the relative difference between the second sense signal Ref and the first sense signal S_1 is smaller than the second default value. If the light sensing module 10 is determined being operated in a touched status, the adjustment method goes to step S413, otherwise goes to step S409.

Next, the comparison module 30 is configured to compare a relationship, between the first default value and the sense value, whether or not to satisfy a determination condition so as to determine whether or not to provide an adjustable driving voltage required by the light sensing apparatus for an adjustment of a light sensing characteristic thereof (step S409). The determination condition is, for example, that an accumulated number, which is the number of the sense values greater than or equal to the first default value (basically, the first default value is configured to be less than the second default value) is greater than or equal to a threshold value (for example, 10). In particular, the time length for the count of the accumulated number is a frame time; wherein the accumulated number is configured to zero at the end of one frame time, and is accumulated again from zero. Moreover, through a modulation of the threshold value, the time for the adjustment of the light sensing characteristics of the light sensing apparatus 100 accordingly is modulated.

Next, the accumulated number is added by 1 if the sense value is greater than or equal to the first default value (step S409-1), and the accumulated number added by 1 is then compared with the threshold value (step S409-2). If the accumulated number is greater than or equal to the threshold value, the accumulated number is configured to zero (step S409-3) and the adjustment method goes to step S411. In step S409-2, if the sense value is less than the first default value, which indicates that the second light sensing unit 13 and the first light sensing unit 11 are not required to be adjusted, the adjustment method goes to the step S403; and afterwards, either the step S409-1 or the step S409-2 is consequently executed according to the relationship between the sense value and the first default value.

Moreover, the accumulated number is configured to zero in response to a touched status (step S413).

Next, if the relationship between the first default value and the sense value satisfies the determination condition, the adjustment module 40 is configured to provide the adjustable driving voltage so as to adjust the light sensing characteristics of the light sensing module 10 of the light sensing device 100 (step S411). In other words, in the present embodiment through modulating (for example, decreasing) a voltage difference between the gate and source terminals of the first light sensing transistor T1 and/or the second light sensing transistor T2, the light sensing characteristics of the light sensing module 10 can be modulated.

Figure 5:
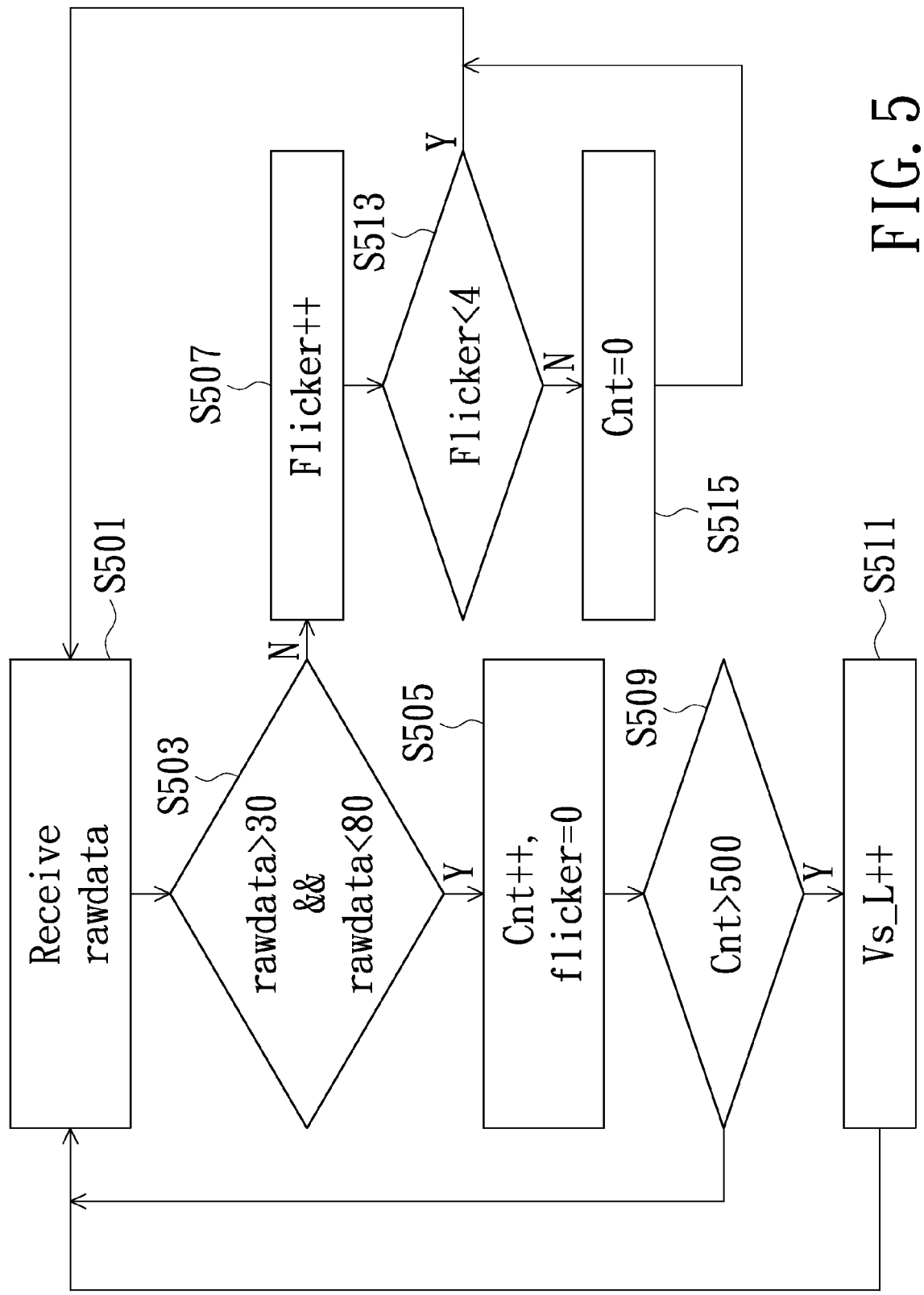
FIG. 5 is a schematic flow chart illustrating an adjustment method for a light sensing apparatus in accordance with another embodiment of the present disclosure.
Figure 6:
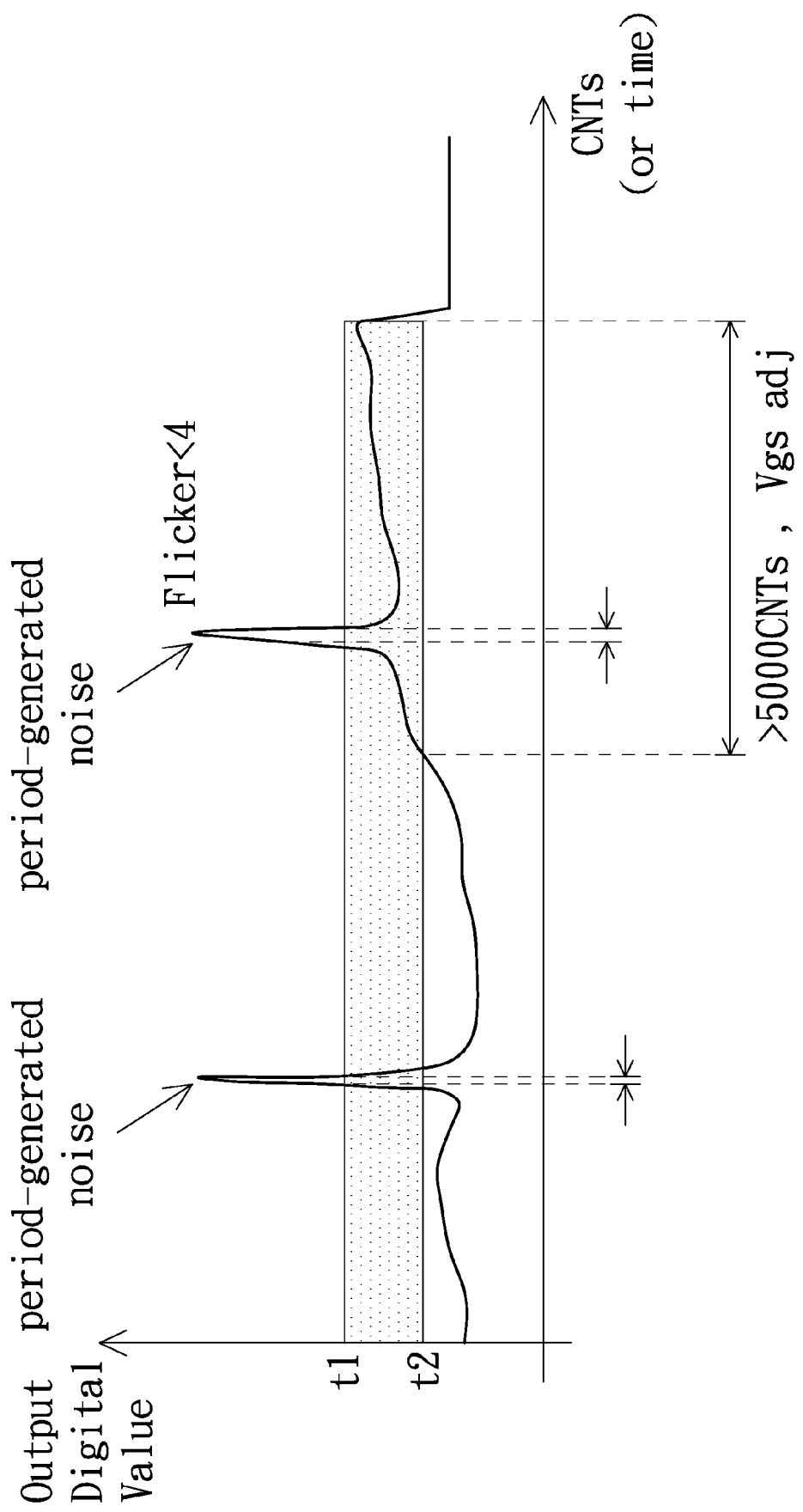
FIG. 6 is a schematic exemplary timing sequence view of the output digital value (rawdata) associated with the light sensing apparatus shown in FIG. 1C; and FIG. 7A

FIG. 5 is schematic flow chart of an adjustment method for a light sensing apparatus in accordance with another embodiment of the present disclosure. FIG. 6 is a schematic exemplary timing sequence view of the output digital value (rawdata) associated with the light sensing apparatus 110 shown in FIG. 1C. Please refer to FIGS. 1C, 1E, 5 and 6. The signal conversion module 20a outputs rawdata (or, the sense value) according to the sense signals S_1~S_n from the light sensing module 10 (step S501). Then, the comparator 33 compares the rawdata with the first default value (e.g., 30) and the second default value (e.g., 80) of the default value set 31a thereby determining whether the raw data is located between the first default value (e.g., 30) and the second default value (e.g., 80) (step S503). Next, an accumulated number is added by one (Cnt++) and a flicker is set to zero (Flicker=0) if the raw data is located between the first default value (e.g., 30) and the second default value (e.g., 80) (step S505). Next, the processing module 60 determines whether or not the accumulated number (Cnt) is greater than a threshold value (e.g., 500) (step S509). The adjustment method goes back to step 501 if the accumulated number (Cnt) is not greater than the threshold value (e.g., 500); alternatively, the control module 50 provides, if the accumulated number (Cnt) is greater than the threshold value (e.g., 500), an adjustable driving voltage (e.g., Vs with an increased logic-low value, Vs_L++) required by the light sensing apparatus 110 is increased for an adjustment of a light sensing characteristic thereof (step S511). The Flicker is added by one (Flicker++) if the raw data is smaller the first default value (e.g., 30) or greater than the second default value (e.g., 80) (step S507). Next, the processing module 60 determines whether or not the Flicker is smaller than a specific value (e.g., 4) (step S513). The accumulated number is reset to zero (Cnt=0) if the Flicker is not smaller than the specific value (e.g., 4) (step S515); alternatively, the adjustment method goes back to step 501 if the Flicker is smaller than the specific value (e.g., 4). In this embodiment as shown in FIG. 6, specifically, the light sensing apparatus 110 is determined to be in a lightpen touch state if the raw data has an output digital value greater than the second default value t1 (e.g., 80); the light sensing apparatus 110 is determined to be in a non-touch touched if the raw data has an output digital value smaller than the first default value t2 (e.g., 30); the light sensing apparatus 110 is required to be adjusted the light sensing characteristic thereof if the raw data, located between the first default value t2 (e.g., 30) and the second default value t1 (e.g., 80), has a duration greater than 500 CNTs. In addition, the accumulated number will not stop being accumulated if the noise has a duration smaller 4 CNTs.

In addition, the digital-to-analog converter 41 is configured to have an output range A from a minimum output range MIN(A) to a maximum output range MAX(A); wherein MAX(A) is greater than MIN(A). Thus, the second default value (e.g., 80) can be obtained by: MIN(A)+A*0.4, and the first default value (e.g., 30) can be obtained by: MIN(A)+A*0.1; and the present disclosure is not limited thereto.

Figure 7A:
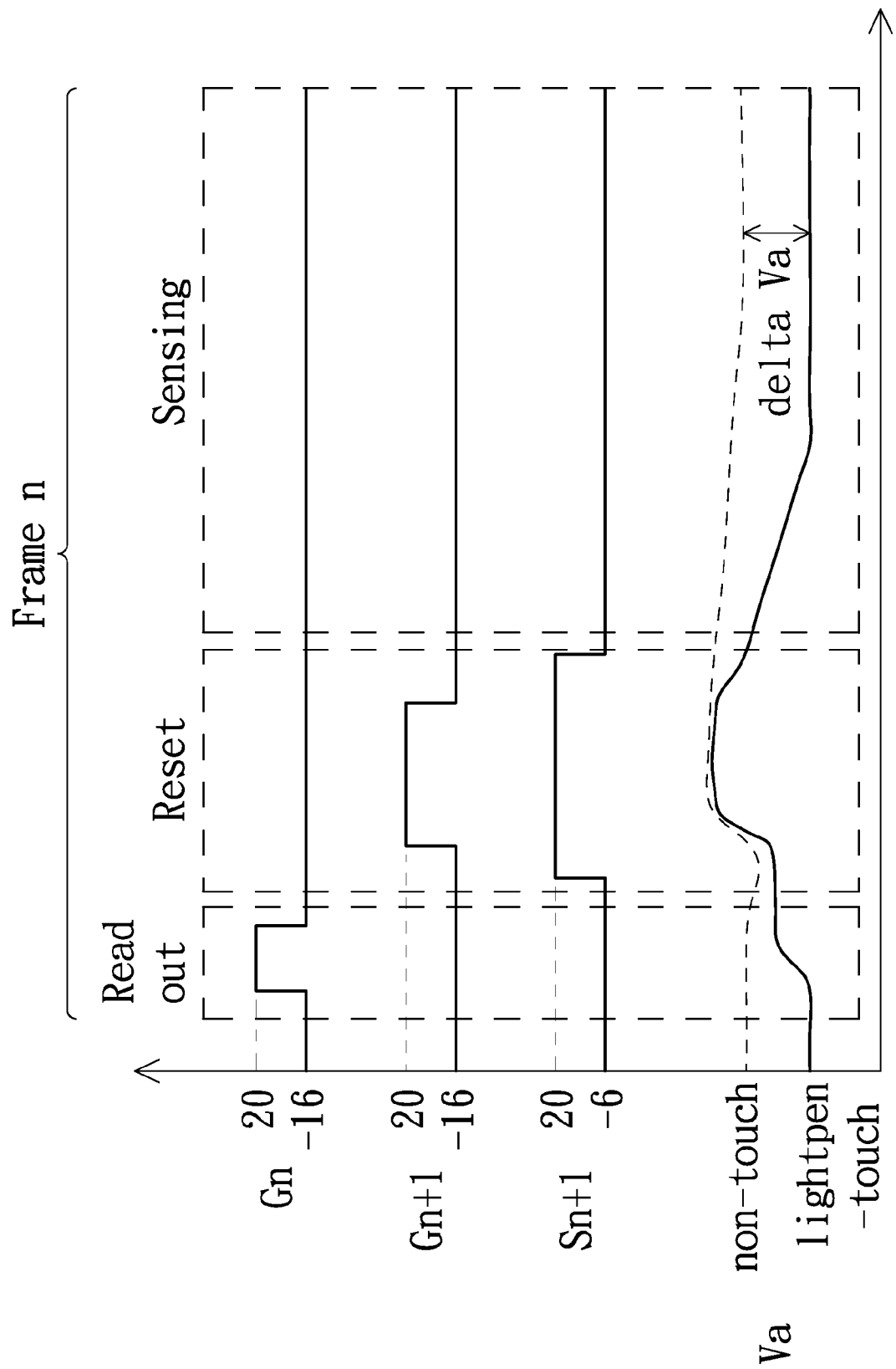
FIG. 7B is a schematic showing time sequence view of the wave form of the light sensing module in FIG. 2.
Figure 7B:
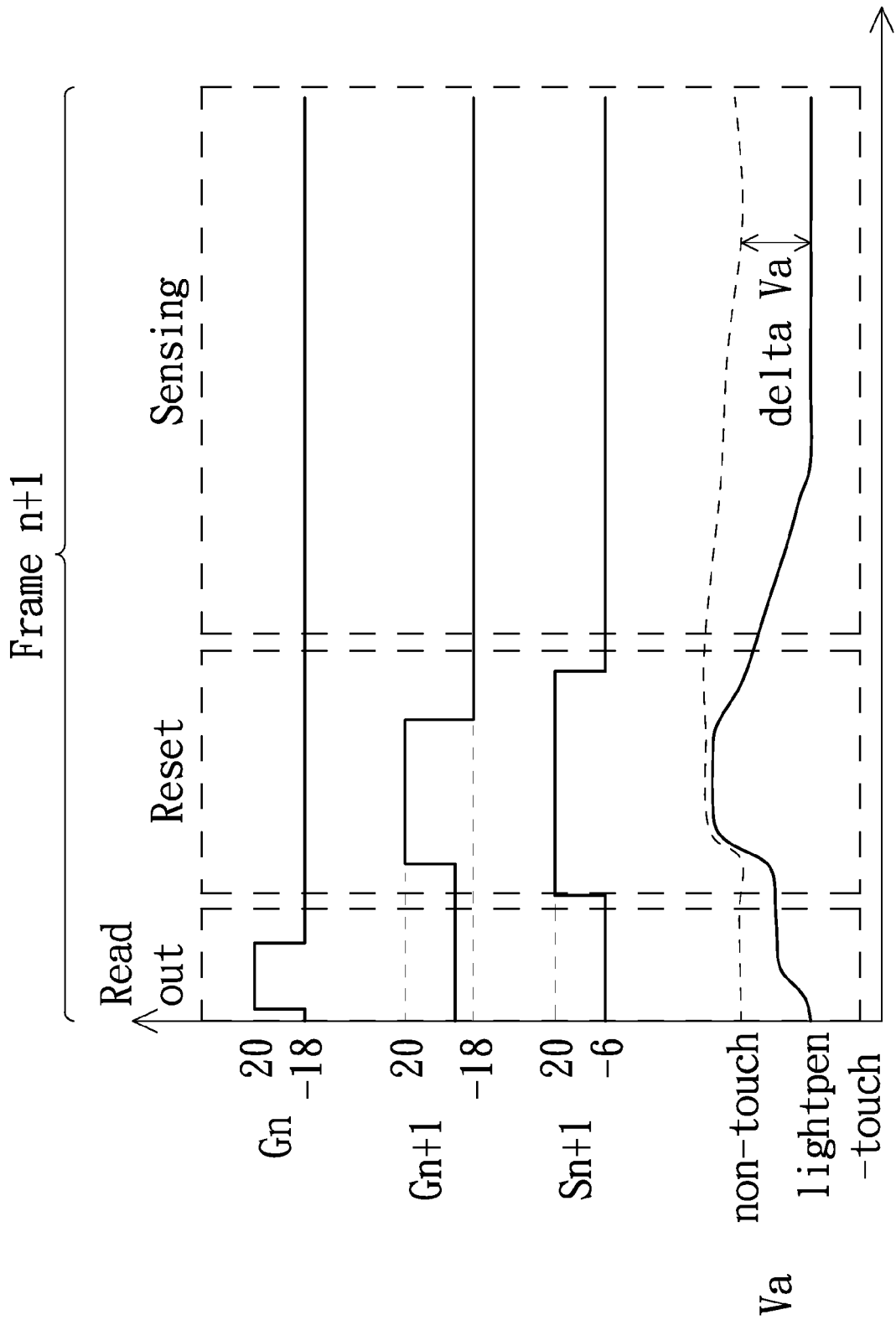

FIG. 7A and FIG. 7B is a schematic showing time sequence view of the waveform of the light sensing module in FIG. 2; wherein the voltage Va (dotted line) is obtained while the light sensing module is not being illuminated, the voltage Va (solid line) is obtained while the light sensing module is being illuminated by a light pen, and the logic-low voltage levels of the first control signal Gn and second control signal Gn+1 in FIG. 7B are obtained by modulating that in FIG. 7A according to the aforementioned associated descriptions. Therefore, as illustrated in FIGS. 7A and 7B, through configuring the second control signal Gn+1 from the logic-low of −16V in the sensing phase in frame n to the logic-low of −18V in the sensing phase in frame n+1, the light sensing apparatus of the present disclosure can have a more distinguishable voltage Va between the non-touch state and lightpen-touch state and consequently have more correct sensing results. More detailly, the logic-low voltage level of the first control signal Gn and second control signal Gn+1 in FIG. 7B is more negative than in FIG. 7A. As the result, the leakage current of transistor T1 is tuned to be smaller in a same environment condition. However, when a strong light is emitting on the transistor T1, the leakage current of the transistor T1 is still large enough to pull the voltage Va to a low voltage both in FIG. 7A and FIG. 7B. Therefore, the voltage difference (delta Va) between the voltages Va respectively obtained in the illumination and non-illumination states is larger in FIG. 7B than that in FIG. 7A, and consequently the two states are more distinguishable.

To sum up, in the light sensing apparatus and the adjustment method thereof according to the present disclosure, the control module is configured to determine, according to a first sense signal and a second sense signal from the light sensing module, that whether or not the light sensing module has a light sensing characteristic variation, and output an adjustable driving voltage, if having the light sensing characteristic variation, to the light sensing module so as to adjust the light sensing characteristic of the light sensing module. Accordingly, the sensing result errors occurring in a convention light sensing module is prevented. Moreover, due to the second light sensing unit 13 and the first light sensing unit 11 are arranged to be close to each other and both have a similar light degree thereon, the second light sensing unit 13 and the first light sensing unit 11 both can have a similar component ageing degree. Therefore, the sensing result errors resulted from the ageing degree can be eliminated through adjusting the voltage difference between the gate and source terminals of the light sensing transistor. Furthermore, it is understood that the present disclosure does not limit the number of the light sensing unit. In other words, if the light sensing module 10 includes more than two light sensing units, the light sensing characteristics of these light sensing units still can be adjusted sequentially according to the aforementioned embodiments.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light sensing apparatus, comprising:
a light sensing module configured to output a first sense signal and a second sense signal according to a light intensity emitting thereon;
a signal conversion module electrically coupled to the light sensing module and configured to receive the first and second sense signals from the light sensing module and output a sense value according to a relative difference between the first and second sense signals; and
a processing module electrically coupled to the signal conversion module and configured to adjust a light sensing characteristic of the light sensing module according to the sense value so as to adjust the light sensing characteristic of the light sensing module.

2. The light sensing apparatus according to claim 1, wherein the light sensing module comprises:
   a first light sensing unit comprising:
      a first transistor comprising a first terminal, a second terminal and a gate terminal for receiving a first control signal;
      a first capacitor comprising a first terminal electrically coupled to the first terminal of the first transistor, a second terminal for receiving a common voltage;
      a first light sensing transistor comprising a first terminal electrically coupled to the first terminal of the first capacitor, a gate terminal for receiving a second control signal and a second terminal for receiving a third control signal, wherein the first transistor is, when being switched-on, configured to output the first sense signal from the first terminal of the first capacitor, and the second control signal and/or the third control signal is control by the processing module to adjust a light sensing characteristic of the light sensing module; and
   a second light sensing unit disposed adjacent to the first light sensing unit and comprising:
      a second transistor comprising a first terminal, a second terminal and a gate terminal for received the first control signal;
      a second capacitor comprising a first terminal electrically coupled to the first terminal of the second transistor and a second terminal for receiving the common voltage;
      a second light sensing transistor comprising a first terminal electrically coupled to the first terminal of the second capacitor, a gate terminal for receiving a fourth control signal and a second terminal for receiving a fifth control signal, wherein the second transistor is, when being switched-on, configured to output the second sense signal from the first terminal of the second capacitor thereof.

3. The light sensing apparatus according to claim 2, wherein the first and second transistors each are configured to have a gate terminal for receiving a first control signal, and the first light sensing transistor is configured to have a gate terminal for receiving a second control signal and a second terminal receiving a third control signal, the second light sensing transistor is configured to have a gate terminal for receiving a fourth control signal and a second terminal for receiving a fifth control signal, wherein the first control signal has a rising edge leading ahead of a rising edge of the second and a rising edge of the third control signals, the second and third control signals each have an identical time sequence, the first control signal has a rising edge lagging behind that rising edge of the fourth and rising edge of fifth control signals, the fourth and fifth control signals each have an identical time sequence.

4. The light sensing apparatus according to claim 2, wherein a voltage difference between the gate terminal and the second terminal of the first light sensing transistor is configured to be changed through adjusting a low voltage level of the second control signal and or a low voltage level of the third control signal.

5. The light sensing apparatus according to claim 2, wherein the processing module comprises:
   a comparison module, electrically coupled to the signal conversion module and stored with a default value, configured to compare the sense value with the default value and determine whether or not to adjust the light sensing characteristic of the light sensing module according to a determination condition; and
   an adjustment module, electrically coupled to the comparison module and the light sensing module, configured to adjust the second control signal and/or the third control signal according to a comparison result provided by the comparison module so as to adjust a light sensing characteristic of the light sensing module.

6. The light sensing apparatus according to claim 5, wherein the signal conversion module comprises:
   a differential amplifier configured to receive the first and second sense signals and output a differential signal according to a relative difference between the first and second sense signals; and
   an analog-to-digital converter electrically coupled to the differential amplifier and configured to receive the differential signal and convert the differential signal into the sense value;
   the comparison module comprises:
      a register configured to store and output the default value; and
      a comparator electrically coupled to the register and configured to receive the default value from the register and the sense value from the analog-to-digital converter, and compare the sense value with the default value and accordingly output the comparison result;
   the adjustment module comprises:
      a digital-to-analog converter configured to receive the comparison result and provide the second control signal and the third control signal according to the comparison result.

7. An adjustment method for a light sensing apparatus, comprising:
   outputting a first sense signal and a second sense signal according to a light intensity emitting on a light sensing module of the light sensing apparatus;
   outputting a sense value according to a relative difference between the first sense signal and the second sense signal; and
   comparing the sense value at different time with a default value to obtain an accumulated number, which indicates times of the sense value being greater than or equal to the default value for a specific duration, so as to determine whether or not to adjust a light sensing characteristic of the light sensing module of the light sensing apparatus.

8. The adjustment method for a light sensing apparatus according to claim 7, wherein comparing the sense value at different sampling time with a default value to obtain an accumulated number, which indicates accumulated times of the sense value being greater than or equal to the default value, so as to determine whether or not to adjust the light sensing characteristic of the light sensing module of the light sensing apparatus comprises:
   adding the accumulated number by 1 when the sense value is greater than or equal to the default value;
   comparing the accumulated number with a threshold value; and
   adjust the light sensing characteristic of the light sensing module of the light sensing apparatus and configuring the accumulated number to zero if the accumulated number is greater than or equal to the threshold value.

9. The adjustment method for a light sensing apparatus according to claim 8, further, after outputting the first sense signal and the second sense signal according to the light intensity emitting on the light sensing apparatus, comprising:

determining whether or not the light sensing apparatus is being touched according to the second sense signal and a plurality of third sense signal provided form the light sensing module; and configuring the accumulated number to zero if the light sensing apparatus is touched;

wherein a time for accumulating the accumulated number is a frame time and the accumulated number is configured to zero at the end of the frame time.

10. A light sensing apparatus, comprising:

a light sensing module configured to output a plurality of sense signals according to a light intensity emitting thereon;

a signal conversion module electrically coupled to the light sensing module and configured to receive the sense signals from the light sensing module and output a sense value according to the sense signals; and a processing module electrically coupled to the signal conversion module and configured to determined whether or not to adjust a light sensing characteristic of the light sensing module according to a comparison result obtained from comparing an accumulated number to a threshold value, wherein the accumulated number indicates that a number of the sense values received within a specific time period located between a first default value and a second default value.

11. The light sensing apparatus according to claim 10, wherein the light sensing module comprises at least a light sensing unit, and each light sensing unit comprises:

a first transistor comprising a gate terminal for receiving a first control signal, a first terminal and a second terminal;

a first capacitor comprising a first terminal electrically coupled to the first terminal of the first transistor and a second terminal for receiving a common voltage; and a light sensing transistor comprising a first terminal electrically couple to the first terminal of the first capacitor, a gate terminal for receiving a second control signal and a second terminal for receiving a third control signal;

wherein the first transistor is, when being switched-on, configured to output the sense signal from the first terminal of the first capacitor, and the second control signal and/or the third control signal is control by the processing module to adjust a light sensing characteristic of the light sensing module of the light sensing module.

12. The light sensing apparatus according to claim 11, wherein the first transistor is configured to have a gate terminal for receiving a first control signal, the light sensing transistor is configured to have a gate terminal for receiving a second control signal and a second terminal for receiving a third control signal, wherein the first control signal has a rising edge leading ahead of a rising edge of the second and a rising edge of the third control signals, the second and third control signals have a identical time sequence.

13. The light sensing apparatus according to claim 11, wherein a voltage difference between the gate terminal and the second terminal of the first light sensing transistor is configured to be changed through adjusting a low voltage level of the second control signal and/or a low voltage level of the third control signal.

14. The light sensing apparatus according to claim 11, wherein the processing module comprises:

a comparison module, electrically coupled to the signal conversion module and stored with a default value set, configured to compare the sense value with the default value set and determine whether or not to adjust the light sensing characteristic of the light sensing module according to a determination condition; and an adjustment module, electrically coupled to the comparison module and the light sensing module, configured to adjust the light sensing characteristic of the light sensing module according to a comparison result provided by the comparison module so as to adjust a light sensing characteristic of the light sensing module.

15. The light sensing apparatus according to claim 14, wherein the signal conversion module comprises:

a plurality of operation amplifiers, each being configured to receive the sense signals and accordingly output an integrated signal; and an analog-to-digital converter electrically coupled to the operation amplifier and configured to receive the integrated signal and convert the integrated signal into the sense value;

the comparison module comprises:

a register configured to store and provide the default value set; and a comparator electrically coupled to the register and configured to receive the default value set from the register and the sense value from the analog-to-digital converter, and compare the sense value with the default value set and accordingly output the comparison result;

the adjustment module comprises:

a digital-to-analog converter configured to receive the comparison result, convert the comparison result into the adjustable driving voltage and output the adjustable driving voltage to the gate and/or source terminals of the light sensing transistor.

16. The light sensing apparatus according to claim 14, wherein the default value set is constituted by a first default value and a second default value, the digital-to-analog converter is configured to have an output range A from a minimum output range MIN(A) to a maximum output range MAX(A), and MAX(A) is greater than MIN(A), and the first default value=MIN(A)+A*0.4, and the second default value=MIN(A)+A*0.1, wherein the comparison module is further configured to count a number of the sense values received within a specific time period located between the first and second default values thereby obtaining an accumulated number, the adjustment module is configured to adjust the light sensing characteristic of the light sensing module if the accumulated number is greater than a threshold value.

* * * * *